A. D. Armstrong,
Metal Can.
No. 69,154. Patented Sep. 24, 1867.
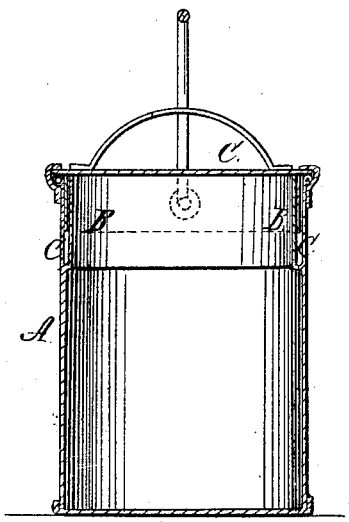
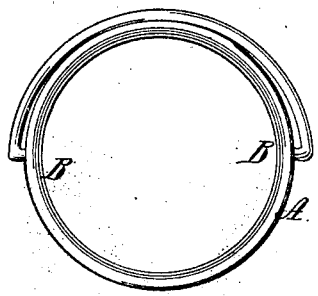
Witnesses:
Theo Tusche
T. B. Mosher
Inventor:
A D Armstrong
Per Munn & Co
Attorneys

United States Patent Office.

ANDREW D. ARMSTRONG, OF PITTSBURG, PENNSYLVANIA.

Letters Patent No. 69,154, dated September 24, 1867.

IMPROVED CAN.

The Schedule referred to in these Letters Patent and making part of the same.

TO ALL WHOM IT MAY CONCERN:

Be it known that I, ANDREW D. ARMSTRONG, of Pittsburg, in the county of Allegheny, and State of Pennsylvania, have invented a new and useful improvement in Cans; and I do hereby declare that the following is a full, clear, and exact description thereof, which will enable those skilled in the art to make and use the same, reference being had to the accompanying drawings, forming part of this specification.

This invention relates to an improvement in cans, and is specially serviceable for cans used to contain white lead and similar substances. It consists in providing a second or internal rim to the can, making the lid set perfectly tight. In the accompanying drawings—

Figure 1 is a top view of the can, with lid removed; and

Figure 2 is a vertical section thereof, with lid in place.

Similar letters of reference indicate corresponding parts.

A is the body of the can, of usual form. B is the internal rim, extending round the mouth of the can to about one-fourth its depth. C, the lid fitting into the can between the two rims, as seen in fig. 2, whereby the lid is secured and made to set perfectly tight, and the can may be carried in any position without risk of leakage of its contents.

I claim as new, and desire to secure by Letters Patent—

The can A, provided with the internal rim B, in manner and for the purposes substantially as above set forth and described.

ANDREW D. ARMSTRONG.

Witnesses:
    AND. HUMBERT,
    JOHN GELSTON,
    JOHN R. IRWIN.